United States Patent [19]

Hirasawa

[11] Patent Number: 5,179,168
[45] Date of Patent: Jan. 12, 1993

[54] IONOMER COMPOSITION

[75] Inventor: Eisaku Hirasawa, Ichihara, Japan

[73] Assignee: Dupont-Mitsui Polychemicals Co., Ltd., Tokyo, Japan

[21] Appl. No.: 585,926

[22] Filed: Sep. 21, 1990

[30] Foreign Application Priority Data

Sep. 21, 1989 [JP] Japan .................. 1-243546

[51] Int. Cl.⁵ .................. C08L 33/02; C08L 23/04
[52] U.S. Cl. .................. 525/221; 525/240; 525/919
[58] Field of Search .................. 525/221, 919, 240

[56] References Cited

U.S. PATENT DOCUMENTS

| | | | |
|---|---|---|---|
| 4,252,924 | 2/1981 | Chatterjee | 525/329.5 |
| 4,308,365 | 12/1981 | Czerwinski | 525/377 |
| 4,367,113 | 1/1983 | Karim et al. | 525/179 |
| 4,690,981 | 9/1987 | Statz | 525/329.6 |
| 4,783,494 | 11/1988 | Allen | 525/67 |
| 4,801,649 | 1/1989 | Statz | 525/221 |
| 4,882,393 | 11/1989 | Herwig et al. | 525/330.2 |
| 4,956,418 | 9/1990 | Tanaka et al. | 526/241 |

FOREIGN PATENT DOCUMENTS

| | | | |
|---|---|---|---|
| 58-217533 | 6/1982 | Japan | 525/221 |
| 61-44937 | 8/1984 | Japan | 525/221 |
| 1207343 | 2/1988 | Japan | 525/221 |

Primary Examiner—James J. Seidleck
Assistant Examiner—W. R. H. Clark
Attorney, Agent, or Firm—Sherman and Shalloway

[57] ABSTRACT

Disclosed is an ionomer composition comprising an ethylene/unsaturated carboxylic acid copolymer which is at least partially neutralized with at least one alkali metal selected from the group consisting of potassium, rubidium and cesium, wherein the ethylene/unsaturated carboxylic acid copolymer is a blend comprising (A) an ethylene/unsaturated carboxylic acid copolymer having an unsaturated carboxylic acid content of 6 to 15 mole % and (B) an ethylene/unsaturated carboxylic acid copolymer having an unsaturated carboxylic acid content of 0.5 to 5 mole % at an (A)/(B) weight ratio of from 10/90 to 80/20, and the alkali metal is present in an amount at least 0.4 millimole but smaller than 1.3 millimoles per gram of the ionomer composition.

This ionomer composition has an excellent antistatic property and an excellent heat moldability.

16 Claims, No Drawings

IONOMER COMPOSITION

BACKGROUND OF THE INVENTION (1) Field of the Invention

The present invention relates to a novel ionomer composition. More particularly, the present invention relates to an ionomer composition having an excellent antistatic property and an excellent heat moldability. Furthermore, the present invention relates to uses of this ionomer composition as an antistatic agent and an antistatic resin composition.

(2) Description of the Prior Art

In general, molded articles of thermoplastic polymers are readily charged with static electricity, and it is well-known that various troubles are caused by charging with static electricity while these molded articles are used or processed. Various methods have been proposed and practised as the antistatic method for these molded articles. However, these methods are defective in some points or other. For example, the method comprising kneading an antistatic agent into a resin composition, which is generally adopted, is defective in that the surface is made sticky or stained by bleeding of the antistatic agent, the change of the electroconductivity by external conditions is large and the attained antistatic effect is not durable. Moreover, the method comprising adding an electroconductive filler such as electroconductive carbon is defective in that no stable antistatic effect can be attained unless the electroconductive filler is added in a large amount, the obtained molded article therefore becomes opaque, and the filler falls from the surface of the molded article to cause contamination. Furthermore, there is known a method in which the surface of a molded article is covered with an electroconductive material such as a metal or a metal oxide by coating or vacuum deposition. However, this method is defective in that the method can be applied only to a molded article having a simple shape, the manufacturing cost increases and the molded article becomes opaque.

As the means for obviating these defects, there has already been proposed a method in which an antistatic property is given to a polymer per se. For examples, Japanese Unexamined Patent Application No. 60-240704 discloses an electroconductive resin comprising an ionomer formed by neutralizing an ethylene/unsaturated carboxylic acid copolymer with an alkali metal selected from the group consisting of Na, K, Rb and Cs, wherein the amount of the alkali metal is at least 1.3 millimoles per gram of the resin. When we examined this proposal, it was found that although the above-mentioned defects of the conventional techniques can be overcome by this proposal, the proposal involves the following problems. Namely, in order to obtain a sufficient antistatic effect, it is necessary that the alkali metal should be contained in an amount of at least 1.5 millimoles per gram of the resin, and therefore, the moisture-absorbing property of the ionomer increases and a trouble of foaming is often caused at the molding step. Furthermore, since the alkali metal is contained at a high concentration, it is inevitably necessary that the content of the unsaturated carboxylic acid in the ethylene/unsaturated carboxylic acid copolymer should be increased, and this increase of the content of the unsaturated carboxylic acid results in lowering of the melting point of the ionomer and degradation of the heat resistance and the application field is limited. Moreover, the manufacturing cost of such a copolymer having a high unsaturated carboxylic acid content is large.

SUMMARY OF THE INVENTION

We made research with a view to overcoming the defects and problems of the above-mentioned ionomer, and as the result, it was found that if an ionomer composition comprising at least two specific ionomers is used, a sufficient antistatic effect can be attained even with a reduced amount of an alkali metal. We have now completed the present invention based on this finding.

It is therefore a primary object of the present invention to provide an ionomer in which the moisture absorbing property is reduced as compared with that of the conventional ionomer if the antistatic property is at the same level, and therefore, the foaming tendency at the molding step is moderated.

Another object of the present invention is to provide an ionomer for which an ethylene/unsaturated carboxylic acid copolymer having a lower unsaturated carboxylic acid content can be used, and which has an improved heat resistance if an antistatic effect is at the same level and which is available at a smaller cost.

Still another object of the present invention is to provide a composition having an improved antistatic property, which comprises an ionomer as mentioned above and other thermoplastic polymer.

More specifically, in accordance with one fundamental aspect of the present invention, there is provided an ionomer composition comprising an ethylene/unsaturated carboxylic acid copolymer which is at least partially neutralized with at least one alkali metal selected from the group consisting of potassium, rubidium and cesium, wherein the ethylene/unsaturated carboxylic acid copolymer is a blend comprising (A) an ethylene/unsaturated carboxylic acid copolymer having an unsaturated carboxylic acid content of 6 to 15 mole % and (B) an ethylene/unsaturated carboxylic acid copolymer having an unsaturated carboxylic acid content of 0.5 to 5 mole % at an (A)/(B) weight ratio of from 10/90 to 80/20, and the alkali metal is present in an amount at least 0.4 millimole but smaller than 1.3 millimoles per gram of the ionomer composition.

In accordance with another aspect of the present invention, there is provided an antistatic agent comprising the above-mentioned ionomer composition.

In accordance with still another aspect of the present invention, there is provided an antistatic resin composition comprising (I) the above-mentioned ionomer composition and (II) a thermoplastic polymer as a (I)/(II) weight ratio of from 5/95 to 99/1.

DETAILED DESCRIPTION OF THE PREFERRED EMBODIMENTS

The ionomer composition of the present invention consists of a blend comprising at least two ionomers. Not only a binary polymer comprising ethylene and an unsaturated caroboxylic acid but also a multi-component polymer comprising other unsaturated carboxylic acid ester or vinyl ester as a comonomer in addition to the above-mentioned two components can be used as the ethylene/unsaturated carboxylic acid copolymer as the base of each ionomer.

α,β-unsaturated carboxylic acids having 3 to 8 carbon atoms are preferably used as the unsaturated carboxylic acid. For example, there can be mentioned acrylic acid, methacrylic acid, maleic anhydride and monoethyl maleate. As the unsaturated carboxylic acid ester to be used as the third component of the copolymer, there can be mentioned esters of the above-mentioned α,β-unsaturated carboxylic acids with alcohols having 1 to 12 carbon atoms. For example, there can be used methyl, ethyl, isopropyl, n-propyl, n-butyl, isobutyl, tert-butyl and 2-ethylhexyl esters. As the vinyl ester, there can be mentioned, for example, vinyl acetate and vinyl propionate.

The ionomer used in the present invention is formed by neutralizing partially or completely the unsaturated carboxylic acid component of the above-mentioned ethylene/unsaturated carboxylic acid copolymer as the base with at least one alkali metal selected from the group consisting of potassium, rubidium and cesium. This ionomer is schematically represented by the following formula:

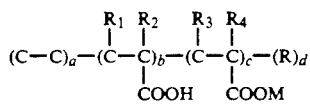

wherein $R_1$, $R_2$, $R_3$ and $R_4$ each represent hydrogen atom, an alkyl group or other substituent, M represents an alkali metal, R represents a comonomer component which can be contained if desired, and a, b, c and d represent molar fractions satisfying requirement of $a+b+c+d=1$, $a>0$, $b\geqq 0$, $c>0$ and $d\geqq 0$.

In the present invention, at least two kinds of such ionomers, and the blend is characterized in that at least two ionomers differ in the unsaturated carboxylic acid content in the ethylene/unsaturated carboxylic acid copolymer. Namely, at least two ionomers differ in the value of $(a+b)$ in the above-mentioned formula.

In order to enjoy a highest effect by blending, it is preferred that the difference of the unsaturated carboxylic acid content between ionomers differing in the unsaturated uncarboxylic acid content be at least 2 mole %, especially at least 4 mole %, particularly especially at least 5 mole %. In order to attain a good antistatic property, it is preferred that the unsaturated carboxylic acid content of the ionomer having a higher unsaturated carboxylic acid content be at least 6 mole % [(b+c) in the above formula be at least 0.06], especially at least 7 mole %. However, if the content of the unsaturated carboxylic acid is too high, the water-absorbing property and moisture-absorbing property become large and the manufacturing cost increases. Accordingly, a copolymer having an unsaturated carboxylic acid content not higher than about 15 mole % is preferably used.

In order to attain a high antistatic property in the blend and reduce the moisture-absorbing property, it is preferred that the unsaturated carboxylic acid content of the copolymer having a lower unsaturated carboxylic acid content be not higher than 5 mole %, especially not higher than 3.5 mole %, particularly especially not higher than 2.8 mole %. However, if a copolymer having too low an unsaturated carboxylic acid content is used, excellent characteristics of the ionomer such as the transparency and toughness are degraded. Accordingly, it is preferred that a copolymer having an unsaturated carboxylic acid content of at least 0.5 mole %, especially at least 0.8 mole %, be used.

The ionomer composition of the present invention is a blend comprising at least two kinds of ionomers. Of course, the composition may contain three or more of ionomers. In case of a blend comprising at least three ionomers, at least two ionomers of these ionomers should differ in the unsaturated carboxylic acid content in the ethylene/unsaturated carboxylic acid copolymer. For example, each of the ionomer having a higher unsaturated carboxylic acid content and the ionomer having a lower unsaturated carboxylic acid content may comprise at least two kinds of ionomers.

Ionomers differing in the melt flow rate can be used according to the intended use. For example, ionomers having a melt flow rate of 0.05 to 1000 g/10 min as measured at 190° C. under a load of 2160 g can be used.

In the ionomer composition of the present invention, the difference between the unsaturated carboxylic acid content of the ionomer having a higher unsaturated carboxylic acid content and the unsaturated carboxylic acid content of the ionomer having a lower unsaturated carboxylic acid content is preferably at least 2 mole %. In case of a blend comprising at least three ionomers, the difference between the highest unsaturated carboxylic acid content and the lowest unsaturated carboxylic acid content is preferably at least 2 mole %. Namely, the blend preferably comprises at least two ionomers, between which the difference of the unsaturated carboxylic acid content in the ethylene/unsaturated carboxylic acid copolymer is at least 2 mole %, but an ionomer having an unsaturated carboxylic acid content intermediate between the high and low contents can be further incorporated into the blend, so far as the performances of the ionomer composition are not degraded. However, incorporation of an ionomer having an intermediate unsaturated carboxylic acid content often results in an adverse effect on the antistatic performance.

Other monomer to be included into the base copolymer, such as an unsaturated carboxylic acid ester or a vinyl ester, can be incorporated in an amount of up to about 20 mole % in the ionomer.

The alkali metal in the ionomer in the composition of the present invention is selected from the group consisting of the present invention is selected from the group consisting of potassium, rubidium and cesium. Among these alkali metals, potassium is especially preferably used because it is cheap and easily available.

The content of the alkali metal differs to some extent according to the kind of the ionomer to be blended. However, if the alkali metal content in the ionomer composition is not lower than 0.4 millimole per gram of the composition, especially not lower than 0.7 millimole per gram of the composition, a good antistatic property can be attained.

A higher alkali metal content is preferable from the viewpoint of the antistatic property. However, if the alkali metal content is too high, the moisture-absorbing property increases and troubles are sometimes caused at the molding step. If the alkali metal content is maintained at a level not higher than 1.3 millimoles per gram of the composition, preferably not higher than 1.2 millimoles per gram of the composition, the moisture-absorbing property is drastically lowered and a sufficient antistatic property can be attained.

A small amount of other metal ion, for example, zinc, lithium, magnesium or sodium, may be contained in the ionomer composition of the present invention. However, most of them tend to exert an adverse function of degrading the antistatic property or increasing the moisture-absorbing property, and in view of the object of the present invention, that is, the reduction of the alkali metal content, it is preferred that the content of the above-mentioned metal be controlled to a low level, and it is generally preferred that such metal should not be contained. In the case where other alkali metal such as litium or sodium is contained, the total content of the alkali metals should be controlled to a lever not higher than 1.5 millimoles per gram of the composition, preferably lower than 1.3 millimoles per gram of the composition. It is preferred that the content of a divalent metal such as zinc, magnesium or calcium be controlled to a level not higher than 0.2 millimole per gram of the composition.

The following processes can be adopted for the preparation of the ionomer composition of the present invention.

(1) A process in which ionization is effected while or after ethylene/unsaturated carboxylic acid ester copolymers differing in the unsaturated carboxylic acid copolymer content are blended.

(2) A process in which cosaponification is effected while or after ethylene/unsaturated carboxylic acid copolymers differing in the unsaturated carboxylic acid content are blended.

(3) A process in which ethylene/unsaturated carboxylic acid copolymers or ethylene/unsaturated carboxylic acid ester copolymers are independently converted to ionomers in advance and the ionomers are blended.

(4) A process in which one copolymer is converted to an ionomer and the ionomer is melt-mixed with the other ethylene/unsaturated carboxylic acid polymer as the base polymer.

The ethylene/unsaturated carboxylic acid copolymer and ethylene/unsaturated carboxylic acid ester copolymer used as the starting materials in the above-mentioned processes can be prepared by radical copolymerization under high-pressure and high-temperature conditions. As the known means for forming an ionomer, there can be mentioned a process in which an ethylene/unsaturated carboxylic acid copolymer is partially or completely neutralized in the melted state or in the state dissolved or suspended in a medium such as water with a hydroxide, oxide, carbonate, bicarbonate, acetate or alkoxide of an alkali metal, and a process in which an ethylene/unsaturated carboxylic acid copolymer is saponified in the presence of an alkali metal ion, but a process in which an ethylene/unsaturated carboxylic acid copolymer is melt-kneaded with an alkali metal compound is most convenient and is advantageous from the economical viewpoint.

in view of the balance between the high antistatic performance and the low water-absorbing and moisture-absorbing properties, the blend ratio in the ionomer composition is determined so that the amount of the ionomer having a higher unsaturated carboxylic acid content is 10 to 80 parts by weight, preferably 15 to 60 parts by weight, and the amount of the ionomer having a lower unsaturated carboxylic acid content is 90 to 20 parts by weight, preferably 85 to 40 parts by weight.

The ionomer composition of the present invention can be used for various purposes directly or after optional additives such as an antioxidant, a weathering stabilizer, a lubricant, a slip agent, a pigment, a dye, a crosslinking agent, a foaming agent and a tackifier resin are added according to need. For example, the ionomer composition can be used for a packaging film, a mat, a container, a wall paper sheet, a battery separator and the like. Furthermore, the ionomer composition can be used in the form of a laminate with other thermoplastic resin, a paper sheet or a metal. Moreover, the ionomer composition can be used in the form of an aqueous dispersion as an electroconductive coating agent.

The ionomer composition of the present invention can be used for an antistatic agent, and the ionomer composition can be modified by blending it with other thermoplastic polymer. Moreover, the ionomer composition can be incorporated into other thermoplastic polymer for imparting an antistatic property to the thermoplastic polymer. As the thermoplastic polymer, there can be mentioned polyolefin resins such as high pressure method polyethylene, linear low density polyethylene, medium density polyethylene, high density polyethyllene, polypropylene, poly-1-butene, poly-4-methyl-1-pentene, an ethylene/vinyl acetate copolymer and an ethylene/unsaturated carboxylic ester copolymer, styrene polymers such as polystyrene, an AS resin, an ABS resin, a styrene/butadiene block copolymer and hydrogenation products thereof, poly amides such as nylon 6, nylon 66, nylon 12 and amorphous nylon, polyesters such as polyethylene terephthalate and polybutylene terephthalate, and polycarbonates, polyactals, polyphenylene ethers, acrylic resins, olefin elastomers, polyester elastomers and polyvinyl chloride. The mixing ratio is changed more or less according to the intended use, but in general, the ionomer composition and the thermoplastic resin are mixed at such a mixing ratio that the amount of the ionomer composition is 5 to 99 parts by weight, preferably 10 to 99 parts by weight, and the amount of the thermoplastic resin is 95 to 1 parts by weight, preferably 90 to 1 parts by weight. Of course, for preparing this composition, there can be adopted not only a process in which the ionomer composition prepared in advance is mixed with the thermoplastic resin, but also a process in which a composition of base polymers as starting materials of the ionomer composition are mixed with the thermoplastic resin then, the base polymers are converted to ionomers.

According to the present invention, a molded article having an excellent antistatic property, in which the defects of the conventional electroconductive resins are overcome, can be provided. Namely, the antistatic effect is durable and the reduction of the antistatic effect with the lapse of time is not caused. Moreover, the antistatic effect is not degraded even on contact with water or the like and is not substantially influenced by moisture.

As compared with the heretofore proposed electroconductive ionomers containing an alkali metal at a high concentration, an antistatic effect can be attained at the same level in the ionomer composition of the present invention even at a much lower alkali metal content. Accordingly, the moisture-absorbing property and water-absorbing property can be controlled at very low levels, and therefore, foaming is hardly and molding can be easily accomplished. Furthermore, since the heat resistance is good, the limitation of application fields is moderated. Moreover, the ionomer composition is advantageous in that it can be manufactured at a low cost.

Still further, by incorporating the ionomer composition of the present invention in other thermoplastic polymer, an excellent antistatic effect can be imparted to the thermoplastic polymer.

The present invention will now be described in detail with reference to the following examples that by no means limit the scope of the invention.

The physical properties of thermoplastic resins used as the starting material in the following examples and the obtained resin compositions were determined according to the following methods.

Thermoplastic Resins Used (1) Acid Copolymers (Ethylene/Methacrylic Acid Random Copolymers)

| Acid Copolymer No. | Methacrylic Acid Content | | MFR (190° C., dg/10 min) |
| --- | --- | --- | --- |
| | % by weight | mole % | |
| 1 | 30 | 12.2 | 14 |
| 2 | 20 | 7.5 | 67 |
| 3 | 15 | 5.4 | 60 |
| 4 | 12 | 4.3 | 14 |
| 5 | 10 | 3.5 | 35 |
| 6 | 8.0 | 2.8 | 15 |
| 7 | 4.0 | 1.3 | 7 |
| 8 | 10 | 3.5 | 500 |
| 9* | — | — | 35 |

Note
*ethylene/methacrylic acid/isobutyl acrylate terpolymer comprising 5% by weight (1.8 mole %) of methacrylic acid and 10% by weight (2.5 mole %) of isobutyl acrylate (2) Thermoplastic Resins Other Than Acid Copolymers and Ionomers (a)
Low density polyethylene (LPDE)
Density (23° C.): 0.923 g/ml
MFR (190° C.): 5.0 d/min (b)
Ethylene/vinyl acetate copolymer (EVA)
Vinyl acetate content: 10% by weight
MFR (190° C.): 9 dg/min (c)
Nylon 6
CM-1017c supplied by Toray Measurement Methods (a) MFR
MFR was determined according to the method for JIS K-6760.

(b) Surface Resistivity
The surface resistivity was measured by using a high resistance meter (Model TR-3 supplied by Tokyo Denshi).

(c) Frictional Chargeability
A sample was strongly rubbed with a cotton fabric, and the frictional chargeability was evaluated whether or not a square tissue paper sheet having a side of 0.5 cm was attracted to the sample.

(d) Moisture-Absorbing Property
A sample sheet having a thickness of 1 mm or a sample film having a thickness of 100 μm was allowed to stand still at a temperature of 20° to 27° C. and a relative humidity of 60 to 70% for 1 month, and water absorbed in the sample was measured and the moisture-absorbing property was evaluated based on this amount.

(e) Water-Absorbing Property
A sample sheet having a thickness of 1 mm was immersed in warm water maintained at 50° C. for 1 hour, and the amount of water in the sample (except water adhering to the surface) was measured and the water-absorbing property was evaluated based on this amount.

EXAMPLES 1 THROUGH 4

A laboratory plastomill (supplied by Toyo Seiki) having a capacity of 50 ml was charged with pellets of acid copolymer No. 2 (methacrylic acid content of 7.5 mole %) and acid copolymer No. 7 (methacrylic acid content of 1.3 mole %) at a mixing ratio shown in Table 1 in a total amount of 40 g, and they were mixed under rotation of 60 rpm. After the acid copolymers were fused, powdery potassium carbonate was added in an amount shown in Table 1 and kneading was carried out at the same temperature and same rotation number. Simultaneously with the addition of potassium carbonate, ionization reaction was caused and carbon dioxide gas and water were formed by the reaction. The resin in the laboratory plastomill was foamed and the kneading torque increased. When 6 minutes has passed from the point of the addition of potassium carbonate, foaming was stopped, and when 7 minutes had passed from the point of the addition of potassium carbonate, the kneading torque became equibriated. The ionization reaction was completed in 10 minutes.

The formed potassium ionomer was taken out from the laboratory plastomill, heat-pressed at 160° C. under a pressure of 50 kg/cm$^2$ and cooled by a cold press at 20° C. under a pressure of 50 kg/cm$^2$ to obtain a sample sheet having a thickness of 1 mm. The sample sheet was semitransparent or transparent and did not contain foams at all.

The obtained press sheet was allowed to stand still in air at a temperature of about 25° C. and a relative humidity of 60 to 70% for 7 days, and the surface resistivity and frictional chargeability were measured. It was found that the surface resistivity was $10^7$ to $10^{12}$ Ω and no static electricity was generated by the friction in any sample at all.

The sheet was allowed to stand still in an atmosphere maintained at a temperature of 20° to 27° C. and a relative humidity of 60 to 70% for 7 days, and the moisture-absorbing property was measured. Furthermore, the sample was immersed in warm water at 50° C. for 1 hour, and the water absorption was determined. The obtained results are shown in Table 1.

COMPARATIVE EXAMPLE 1 THROUGH 10

Potassium ionomers composed of one acid copolymer were prepared in the same manner as described in Examples 1 through 4 except that copolymers Nos. 1 through 7 were singly used independently.

Press sheets having a thickness of 1 mm were prepared from these potassium ionomers in the same manner as described in Examples 1 through 4. In case of the potassium ionomer having a potassium ion concentration higher than 1.3 millimoles per gram of the resin, foaming was caused by evaporation of water absorbed at the heat pressing step, and with respect to the sheet obtained by repeating heat pressing at least two times, the surface resistivity, moisture-absorbing property and water-absorbing property were determined in the same manner as described in Examples 1 through 4. In case of each of the ionomers having a potassium ion concentration higher than 1.2 millimoles per gram of the resin, the surface resistivity was lower than $10^{12}$ Ω, and charging was not caused by the friction, but the moisture-absorbing property and water-absorbing property were higher than those of the antistatic ionomers obtained in Examples 1 through 4. In each of the potassium ionomers having an ion concentration lower than 1.2 millimoles per gram of the resin, the surface resistivity was higher than $10^{12}$ Ω and charging was caused by the friction. The obtained results are shown in Table 1.

COMPARATIVE EXAMPLES 11 AND 12

Sodium or zinc ionomers were prepared in the same manner as described in Examples 1 through 4 except that acid copolymer No. 2 alone was used and sodium carbonate or zinc oxide was used as the ion source, and press sheets having a thickness of 1 mm were prepared from these ionomers. Each sample showed a surface resistivity much higher than $10^{12}$ Ω even though the metal salt content exceeded 1.3 millimoles per gram of the resin, and each sample was readily charged by the friction. The obtained results are shown in Table 1.

supplied at a K ion concentration (0.70 to 1.16 millimoles per gram of the resin) shown in Table 2. Ionization was carried out at a resin temperature of 240° C. and an extrusion rate of 15 kg/hr to obtain a pellet of a potassium ion ionomer. This ionomer was formed into a film having a thickness of 100 μm at a resin temperature of 200° to 230° C. by an inflation film-forming machine having a screw diameter of 30 mm. Foaming was not caused at the film-forming step, and the film-forming operation could be performed easily and smoothly. Generation of static electricity, generally observed at the step of forming a low density polyethylene film, was

TABLE 1

| | Composition of Acid Copolymers | | Metal Ion Content | Surface Resistivity | Frictional Chargeability | Water-Absorbing Property (Moisture-Absorbing Property) |
|---|---|---|---|---|---|---|
| | components | parts by weight | (millimoles/ g of resin) | | | (% by weight) |
| Example | | | | | | |
| 1 | acid copolymer No. 2<br>acid copolymer No. 7 | 50<br>50 | K ion 1.16<br>(ionization degree = 83%) | $6 \times 10^7$ | not charged | 17.0<br>(4.2) |
| 2 | acid copolymer No. 2<br>acid copolymer No. 7 | 40<br>60 | K ion 0.94<br>(ionization degree = 78%) | $10^8$ | not charged | 8.9<br>(3.4) |
| 3 | acid copolymer No. 2<br>acid copolymer No. 7 | 30<br>70 | K ion 0.72<br>(ionization degree = 70%) | $8.5 \times 10^{10}$ | not charged | 2.6<br>(2.2) |
| 4 | acid copolymer No. 2<br>acid copolymer No. 7 | 50<br>50 | K ion 0.87<br>(ionization degree = 62%) | $10^{12}$ | not charged | 5.0<br>(2.8) |
| Comparative Example No. | | | | | | |
| 1 | acid copolymer No. 1 | 100 | K ion 2.34<br>(ionization degree = 67%) | $2 \times 10^7$ | not charged | 183.0<br>(11.1) |
| 2 | acid copolymer No. 2 | 100 | K ion 1.65<br>(ionization degree = 71%) | $9 \times 10^7$ | not charged | 58.0<br>(6.9) |
| 3 | acid copolymer No. 2 | 100 | K ion 1.27<br>(ionization degree = 55%) | above $10^{12}$ | charged | 26.0 |
| 4 | acid copolymer No. 2 | 100 | K ion 0.89<br>(ionization degree = 38%) | above $10^{12}$ | charged | 1.1 |
| 5 | acid copolymer No. 2 | 100 | K ion 0.45<br>(ionization degree = 19%) | above $10^{12}$ | charged | 0.30 |
| 6 | acid copolymer No. 3 | 100 | K ion 1.42<br>(ionization degree = 81%) | $3 \times 10^{11}$ | not charged | 41<br>(5.9) |
| 7 | acid copolymer No. 3 | 100 | K ion 1.27<br>(ionization degree = 73%) | above $10^{12}$ | charged | 23<br>(3.8) |
| 8 | acid copolymer No. 4 | 100 | K ion 1.16<br>(ionization degree = 83%) | above $10^{12}$ | charged | 17<br>(3.1) |
| 9 | acid copolymer No. 5 | 100 | K ion 0.98<br>(ionization degree = 85%) | above $10^{12}$ | charged | 9.2<br>(3.3) |
| 10 | acid copolymer No. 2 | 100 | K ion 0.41<br>(ionization degree = 88%) | above $10^{12}$ | charged | 1.3<br>(1.3) |
| 11 | acid copolymer No. 2 | 100 | Na ion 1.65 | above $10^{12}$ | charged | — |
| 12 | acid copolymer No. 2 | 100 | Zn ion 1.65 | above $10^{12}$ | charged | — |

EXAMPLES 5 through 8

A blend comprising pellets of acid copolymers Nos. 2 and 7 at a mixing ratio shown in Table 2 was supplied to a vented screw extruder having a diameter of 65 mm, and an acid copolymer master batch containing 50% by weight of powdery potassium carbonate was further not caused at all. Just after the preparation of the film and after 4 days' standing in an atmosphere maintained at a temperature of 25° C. and a relative humidity of 60%, the surface resistivity and charging by the friction were determined. In each case, the resistivity was low and charging was not caused. The obtained results are shown in Table 2.

TABLE 2

| Example No. | Composition of Acid Copolymer components | parts by weight | Metal Ion Content (millimoles/ g of resin) | Just after Preparation of Film surface resistivity | Just after Preparation of Film frictional chargeability | After 4 Days' Standing at 25§C and 60% RH surface resistivity | After 4 Days' Standing at 25§C and 60% RH frictional chargeability |
| --- | --- | --- | --- | --- | --- | --- | --- |
| 5 | acid copolymer No. 2 | 50 | K ion 1.16 (ionization degree = 83%) | $5 \times 10^7$ | not charged | $1 \times 10^7$ | not charged |
|   | acid copolymer No. 7 | 50 |   |   |   |   |   |
| 6 | acid copolymer No. 2 | 45 | K ion 1.04 (ionization degree = 80%) | $2 \times 10^8$ | not charged | $1 \times 10^8$ | not charged |
|   | acid copolymer No. 7 | 55 |   |   |   |   |   |
| 7 | acid copolymer No. 2 | 40 | K ion 0.93 (ionization degree = 70%) | $4 \times 10^8$ | not charged | $5 \times 10^9$ | not charged |
|   | acid coplymer No. 7) | 60 |   |   |   |   |   |
| 8 | acid copolymer No. 2 | 30 | K ion 0.70 (ionization degree = 68%) | $1 \times 10^{12}$ | not charged | $4 \times 10^{11}$ | not charged |
|   | acid copolymer No. 7 | 70 |   |   |   |   |   |

EXAMPLE 9 and 10

A pellet of an ionomer ionized with K at a ratio of 67% (K ion concentration of 2.34 millimoles per gram of the resin) was prepared from acid copolymer No. 1 in the same manner as described in Examples 5 through 8. Then, 50 parts by weight of this ionomer was melt-kneaded with 50 parts by weight of acid copolymer No. 6 or 7, and the obtained ionomer composition was heat-pressed in the same manner as described in Examples 1 through 4 to obtain a sheet having a thickness of 1 mm. The sheet was allowed to stand still at a temperature of 25° C. and a relative humidity of 60%, and the surface resistivity and frictional chargeability were determined. In each case, charging was caused. The obtained results are shown in Table 3.

EXAMPLES 11 and 12

The potassium ionomer obtained in Examples 5 was melt-kneaded with an ethylene/vinyl acetate copolymer (vinyl acetate content of 10% by weight, MFR of 10 dg/min) or nylon 6 at a mixing ratio shown in Table 4 in an extruder having a screw diameter of 30 mm at a resin temperature of 230° C. The obtained kneaded composition was heat-pressed in the same manner as described in Examples 1 through 4 to form a sheet having a thickness of 1 mm. The obtained sheet was allowed to stand still in air at a temperature of 25° C. and a relative humidity of 60% for 1 week. Then, surface resistivity and frictional chargeability were determined. In each case, charging was not caused. The obtained results are shown in Table 4.

TABLE 3

| Example No. | Ionomer Composition components | Parts by weight | Metal Ion Content (millimoles/ g of resin) | Surface Resistivity | Frictional Chargeability |
| --- | --- | --- | --- | --- | --- |
| 9 | ionomer (ionization product of acid copolymer No. 1) | 50 | K ion 1.17 | $5 \times 10^{11}$ | not charged |
|   | acid copolymer No. 6 | 50 |   |   |   |
| 10 | ionomer (ionization product of acid copolymer No. 1) | 50 | K ion 1.17 | $1 \times 10^{10}$ | not charged |
|   | acid copolymer No. 7 | 50 |   |   |   |

TABLE 4

| Example No. | Thermoplastic Resin Composition components | parts by weight | Surface Resistivity Ω | Frictional Chargeability |
| --- | --- | --- | --- | --- |
| 11 | ionomer of Example 5 | 15 | $2 \times 10^{10}$ | not charged |
|   | nylon 6 | 85 |   |   |
| 12 | ionomer of Example 5 | 25 | $1 \times 10^{12}$ | not charged |
|   | ethylene/vinyl acetate copolymer | 75 |   |   |

EXAMPLES 13 and 14

A blend of pellets of three acid copolymers shown in Table 5 was supplied to the same extruder as used in Examples 5 through 8, and an acid copolymer master batch containing 50% by weight of powdery potassium carbonate was further supplied at a K ion concentration shown in Table 5. Ionization was carried out at a resin temperature of 245° C. and an extrusion rate of 14 kg/hr to obtain a pellet of a potassium ionomer. The ionomer was formed into a film having a thickness of 50 μm by an inflation film-forming machine having a screw diameter of 50 mm at a resin temperature of 200° to 230° C. Foaming was not caused at the film-forming step, and a transparent film could be easily prepared. The prepared film was allowed to stand still in an atmosphere maintained at a temperature of 23° C. and a relative humidity of 50% for 4 days, and then, the surface resistivity and frictional chargeability were determined. In each case, the resistance value was small and charging was not caused. The obtained results are shown in Table 5.

TABLE 5

| Example No. | Composition of Acid Copolymers | | Metal Ion Content (millimoles/ g of resin) | After 4 Days' Standing at 23° C. and 50% RH | |
|---|---|---|---|---|---|
| | components | parts by weight | | surface resistivity | frictional chargeability |
| 13 | acid copolymer No. 2 | 40 | 1.20 | $1.7 \times 10^9$ | not charged |
| | acid copolymer No. 5 | 30 | | | |
| | acid copolymer No. 8 | 30 | | | |
| 14 | acid copolymer No. 2 | 30 | 1.09 | $5.9 \times 10^8$ | not charged |
| | acid copolymer No. 5 | 30 | | | |
| | acid copolymer No. 9 | 40 | | | |

EXAMPLES 15 and 16

A pellet of the potassium ionomer of Example 5 was dry-blended with a pellet of low density polyethylene (density of 0.923 g/ml and MFR of 5.0 dg/min) at a ratio shown in Table 6, and the blend was supplied to a screw extruder having a diameter of 65 mm and kneaded at a temperature of 220° C. to obtain a pellet. By using the same inflation film-forming machine as used in Examples 5 through 8, the pellet was formed into a film having a thickness of 50 μm at a resin temperature of 200° to 230° C. The obtained film was semi-transparent and foams were not found, and the film-forming operation could be carried out easily and smoothly.

The film was allowed to stand still in an atmosphere maintained at a temperature of 25° C. and a relative humidity of 60% for 4 days, and the surface resistivity and frictional chargeability were determined. In each case, charging was not caused. The obtained results are shown in Table 6.

TABLE 6

| Example No. | Resin Composition | | After 4 Days' Standing at 25° C. and 60% RH | |
|---|---|---|---|---|
| | components | parts by weight | surface resistivity | frictional chargeability |
| 15 | K ionomer of Example 5 | 25 | $5 \times 10^{11}$ | not charged |
| | low density polyethylene | 75 | | |
| 16 | K ionomer of Example 5 | 15 | $1 \times 10^{12}$ | not charged |
| | low density polyethylene | 85 | | |

I claim:

1. An ionomer composition comprising a blend of ethylene/unsaturated carboxylic acid copolymers at least partially neutralized with at least one alkali metal selected from the group consisting of potassium, rubidium and cesium, wherein the blend comprises (A) an ethylene/unsaturated carboxylic acid copolymer having an unsaturated carboxylic acid content of 6 to 15 moles % and (B) an ethylene/unsaturated carboxylic acid copolymer having an unsaturated carboxylic acid content of 0.5 to 5 mole % at an (A)/(B) weight ratio of from 10/90 to 80/20, and the alkali metal is present in an amount of at least 0.4 millimole but smaller than 1.3 millimoles per gram of the ionomer composition with the proviso that both of the components (A) and (B) are at least partially neutralized.

2. An ionomer composition as set forth in claim 1, wherein the difference of the unsaturated carboxylic acid content between the copolymers (A) and (B) is at least 2 mole %.

3. An ionomer composition as set forth in claim 1, wherein the unsaturated carboxylic acid is an α,β-unsaturated carboxylic acid having 3 to 8 carbon atoms.

4. An ionomer composition as set forth in claim 1, wherein either one or both of the ethylene/unsaturated carboxylic acid copolymers further contain an unsaturated carboxylic acid ester derived from an alpha, beta unsaturated carboxylic acid having 3 to 8 carbon atoms and an alcohol having 1 to 12 carbon atoms.

5. An ionomer composition as set forth in claim 1, wherein the copolymers (A) and (B) are present at an (A)/(B) weight ratio of from 15/85 to 60/40.

6. An ionomer composition as set forth in claim 1, wherein the alkali metal content is in the range of from 0.7 to 1.2 millimoles per gram of the composition.

7. An ionomer composition as set forth in claim 1, wherein the melt flow rate is in the range of 0.05 to 1000 g/10 min as determined at 190° C. under a load of 2160 g.

8. A polymeric antistatic agent comprising as an active ingredient an ionomer composition comprising a blend of ethylene/unsaturated carboxylic acid copolymers each of which is at least partially neutralized with at least one alkali metal selected from the group consisting of potassium, rubidium and cesium, wherein the blend comprises (A) an ethylene/unsaturated carboxylic acid copolymer having an unsaturated carboxylic acid content of 6 to 15 mole % and (B) an ethylene/unsaturated carboxylic acid copolymer having an unsaturated carboxylic acid content of 0.5 to 5 mole % at an (A)/(B) weight ratio of from 10/90 to 80/20, and the alkali metal is present in an amount of at least 0.4 millimole but smaller than 1.3 millimoles per gram of the ionomer composition.

9. An antistatic resin composition comprising (I) an ionomer composition comprising a blend of ethylene/unsaturated carboxylic acid copolymers each of which is at least partially neutralized with at least one alkali metal selected from the group consisting of potassium, rubidium and cesium, wherein the blend comprises (A) an ethylene/unsaturated carboxylic acid copolymer having an unsaturated carboxylic acid content of 6 to 15 mole % and (B) an ethylene/unsaturated carboxylic acid copolymer having an unsaturated carboxylic acid content of 0.5 to 5 mole % at an (A)/(B)

weight ratio of from 10/90 to 80/20, and the alkali metal is present in an amount of at least 0.4 millimole but smaller than 1.3 millimoles per gram of the ionomer composition, and (II) a thermoplastic polymer at a (I)/(II) weight ratio of 5/95 to 99/1.

10. An antistatic resin composition as set forth in claim 9, wherein the thermoplastic polymer (II) is a polyolefin resin.

11. An antistatic resin composition as set forth in claim 9, wherein the thermoplastic polymer (II) is a polyamide.

12. An antistatic resin imposition as set forth in claim 9, wherein the thermoplastic polymer (II) is a polyester.

13. The antistatic resin composition of claim 9 wherein the blend of copolymers is at least partially neutralized with potassium.

14. The antistatic agent of claim 13 wherein the alkali metal is present in an amount of 0.7 to 1.2 millimoles per gram of the ionomer composition.

15. The ionomer composition of claim 1 wherein the blend of copolymers is at least partially neutralized with potassium.

16. The ionomer composition of claim 15 wherein potassium is present in an amount of 0.7 to 1.2 millimoles per gram of the composition.

* * * * *